UNITED STATES PATENT OFFICE 2,143,850

SEEDING AGENT FOR TITANIUM SALT SOLUTION

Benjamin Wilson Allan, Baltimore, Md.

No Drawing. Application March 14, 1936, Serial No. 68,918

5 Claims. (Cl. 23—202)

This application is a continuation in part of my application Serial #731,998, filed June 22, 1934 now Patent No. 2,040,823.

This invention relates to titanium dioxide and has particular reference to a new and novel method of producing pigmentary titanium oxide by hydrolysis of titanium salt solutions. More particularly it refers to a method of hydrolizing such solutions by the addition thereto of a gel of titanium oxide, which acts to accelerate the hydrolysis, and it has special reference to the use of gels of titanium dioxide prepared by the neutralization of acid titanium salt solutions with alkali carbonates.

Titanium oxide is one of the most popular of the pigments used in the paint industry, because of its chemical inertness and its exceptionally good covering power. It is ordinarily made from rutile (a native titanium oxide mineral) or from ilmenite (an iron titanate mineral). The titanium is put into solution in any desired manner, such as by fusion with an alkali or by attack of the mineral with strong sulfuric acid. The solutions are ordinarily purified by removal, to some extent, of their iron content. In order to get titanium oxide of good pigmentary properties it has been found necessary to hydrolize the titanium oxide from fairly acid solutions, rather than to precipitate the oxide with alkaline materials.

The most economical method for the production of titanium oxide is to start with the mineral ilmenite and attack the mineral with hot concentrated sulfuric acid, generally using sufficient sulfuric acid to form normal salts with all of the iron and titanium present. The attack mass is then leached with water or with weak sulfuric acid, recovered later in the process, the resulting solution containing titanium and iron sulfates with some free acid. In some cases it is advantageous to use smaller percentages of sulfuric acid, in which case the titanium is present as a compound between $TiOSO_4$ and $Ti(SO_4)_2$. The amount of sulfuric acid in the solution is expressed as factor of acidity (F. A.), $TiOSO_4$ representing zero factor of acidity and $Ti(SO_4)_2$ representing 100% F. A.

The sulfate solutions are then reduced so that the iron is present in the ferrous condition, so that iron will not precipitate upon hydrolysis of the solutions. Suspended matter is ordinarily removed by filtration or other form of clarification and the solution is then ready for hydrolysis.

Some solutions are hydrolizable by mere boiling, but solutions made by treatment of ilmenite with acid in the manner above described, produce rather poor yields of titanium oxide on simple boiling. This difference in solutions I attribute to the form of the titanium oxide before solution. Where solutions are made from ortho titanic acid or where ortho titanic acid has been formed and redissolved, hydrolysis is a simple process; where the titanium oxide is dissolved from other modifications, the process of hydrolysis becomes more difficult. The difference is probably due to the fact that ortho titanic acid goes into colloidal rather than into true solution.

Various investigators have suggested different methods of producing solutions which are readily hydrolizable, in every case adding to the solution some titanium oxide which has been precipitated in the form of ortho titanic acid, or which goes into colloidal rather than true solution. In some cases the precipitate is formed in the solution and later dissolved, the hydrolysis being one continuous operation. In other cases a titanium oxide seeding agent is prepared on the outside and thereafter added to the solution. These seeding agents have required careful preparation and handling.

I have discovered that an excellent hydrolysis can be obtained by the use of a gel of titanium oxide, made in any manner well known to the art. For example, I may take a solution of titanium sulfate and prepare a gel from it by neutralizing the sulfuric acid present with an alkaline material. As the alkaline solution is added to the titanium solution a precipitate is thrown down. As the addition is continued the precipitate is for the greater part redissolved, the solution becoming more viscous. After eighty or ninety percent of the alkali has been added, the viscosity drops but it shortly begins to increase in viscosity until at the end of the reaction the solution is a thick gel which can be stirred only with difficulty. On cooling the mass becomes a dry gel.

As a specific example of the formation of this gel, I took 100 ccs. of titanic sulfate solution containing 201 grams of $TiO_2$, 437 grams of $H_2SO_4$ and 46 grams of Fe per liter, and neutralized all of the acid except that combined with the iron with a solution of caustic soda (800 grams per liter concentration). The temperature rose gradually as described in the preceding paragraph until on the addition of the last ten percent of the caustic a violent reaction set in and the whole solution boiled and frothed while the temperature rose to 108° C. The dry gel formed contained 6.56% $TiO_2$.

These titanium oxide gels may be added to solutions of titanium salts which are not in themselves hydrolizable to produce rapid and complete hydrolysis. For example, a solution was made up by reacting on ilmenite with hot concentrated sulfuric acid, reducing the iron to a ferrous condition. The clarified solution contained 201 grams per liter of titanium oxide at a factor of acidity of 43 with 46.0 grams of Fe per liter. To 100 ccs. of this solution one gram of gel obtained as above was added and the solution heated to boiling. At the end of two hours a ninety-six percent recovery was obtained. Where the hydrolysis was carried out without the addition of the gel, such complete recovery was not obtainable in an economic period, the recovery being about sixty percent after six hours boiling.

In another experiment a solution obtained by attacking ilmenite, containing 124.7 grams per liter of titanium oxide at a factor of acidity of 139 with 102 grams of Fe per liter, was hydrolized after the addition of one quarter gram of gel (2% of the titanium oxide in the solution). A ninety-four percent recovery was obtained after one hour. Recovery on the unseeded solution was about fifty percent after six hours.

The gels are insoluble in both cold and hot water and may be washed free of soluble iron salts and sodium sulfate. Either the washed or the unwashed gel may be used, and give substantially the same results.

Gels may be formed not only by neutralization of the titanium sulfate with caustic soda, but any alkali or alkali earth hydroxide, carbonate or sulfide will produce workable gels, and I may use any other titanic salt, such as the chloride, as the source of my titanium. Where alkali earths are used with titanium sulfate, the alkali earth sulfate remains with the gel as a diluent. Gels may likewise be made from alkali or alkali earth titanates by adding the necessary amount of acid.

While extremely good yields are obtained with these gels, trouble has been encountered with some of the gels in that the pigment produced after calcination is not as bright as is desirable. I have recently discovered that this objection can be overcome by the use of titanium gels prepared by the neutralization of titanium salt solutions with alkali metal carbonates.

The reaction between the alkali carbonate and the titanium solution proceeds much as the reaction with caustic alkali, a precipitate being first formed which redissolves, to form a more viscous solution, the reaction mass finally setting to a dry gel. I attribute the superior results obtained from using these carbonate compounds to the fact that the gel is produced under very much lower temperatures than in the case when caustic soda is used as the alkali. It has been found that when caustic soda is employed the temperature rises above 105° C. during the gel formation, whereas, in the case of the carbonate, the temperature never exceeds 60° C. It has been found that the high temperature during the gel production causes some of the gel to become dehydrated and to reverse to a form of titanium hydroxide which, unlike the bulk of the gel, will not dissolve or disperse when added to the solution to be hydrolyzed. It has been shown that this insoluble form of gel is mechanically carried through the hydrolysis step into the final washed pigment. On calcination, this impurity takes on a dark brown discoloration which adversely affects both the brightness and color of the calcined pigment. Experiments have definitely demonstrated this to be the cause of the poor color in the pigment produced from caustic gel. It has been found that this insoluble form of gel can be removed by dispersing the gel in dilute titanium solution and subsequently filtering. The gel thus freed of this impurity gives pigment of excellent color and brightness.

As a specific example of my invention, I prepared a gel as follows:

A solution of titanium sulfate having the following analysis was used for the preparation of the gel:

*Analysis of solution in grams per liter*

| | |
|---|---|
| TiO$_2$ | 271 |
| Fe | 52 |
| H$_2$SO$_4$ | 609 |
| Free acid | 186 |
| A. A. | 518 |
| F. A. | per cent 56 |

A solution of sodium carbonate, saturated at 50° C. was used as the alkali.

To one liter of the above sulfate liquor was added enough soda ash solution to completely neutralize the active acid. The reaction was similar to that when the caustic was used except for the fact that much carbon dioxide escaped and the temperature remained at all times below 60° C.

This gel was used to hydrolyze a solution identical in composition with the solution described above, hydrolyzed with the ordinary gel prepared by neutralization with sodium hydroxide. A substantially similar recovery was obtainable on hydrolysis; but the pigment obtained after calcination, using potassium carbonate as a conditioning agent, was much brighter in color than the pigment prepared with the caustic gel, calcined under identical conditions.

I have found that this superior brightness of color is obtainable with all gels made by neutralizing titanium salt solutions with alkali carbonates, other conditions being equal.

A gel was prepared in a similar manner, using ammonium carbonate as the alkali. The results were practically identical with that of the sodium carbonate except for the fact that the temperature, during gelation, was even lower.

I have also prepared the gel by adding the titanium solution to the alkali carbonate solution, with very good results.

While I prefer to work with alkali metal carbonates, because of their low cost, I consider my invention to reside in the discovery that the gel must be prepared at temperatures substantially below the boiling point of water, to prevent dehydration of the gel.

In the claims, the term "alkali carbonate" is intended to cover the alkali metal group and ammonium.

I claim:

1. The method of hydrolyzing titanium salt solutions which comprises adding to the solution a gel of titanium oxide substantially free of particles not dispersible in the hydrolysis solution, prepared by intermixing a titanium salt solution with an alkali metal carbonate, and heating the solution to effect hydrolysis.

2. The method of hydrolyzing titanium salt solutions which comprises adding to the solution a gel of titanium oxide substantially free of particles not dispersible in the hydrolysis solution, prepared by neutralizing the active acid of a titanium salt solution with an alkali metal carbonate, and heating the solution to effect hydrolysis.

3. The method of hydrolyzing titanium salt solutions which comprises adding to the solution a gel of titanium oxide substantially free of particles not dispersible in the hydrolysis solution, prepared by neutralizing the active acid of a titanium salt solution with sodium carbonate, and heating the solution to effect hydrolysis.

4. The method of hydrolyzing titanium salt solutions which comprises adding to the solution a gel of titanium oxide substantially free of particles not dispersible in the hydrolysis solution, prepared by neutralizing the active acid of a titanium salt solution with ammonium carbonate, and heating the solution to effect hydrolysis.

5. The method of hydrolyzing a titanium salt solution which comprises adding thereto a gel of titanium oxide prepared by neutralizing the active acid of a titanium salt solution with a carbonate selected from the class consisting of alkali metal and ammonium carbonates, and heating the solution to effect hydrolysis.

BENJAMIN WILSON ALLAN.